(12) United States Patent
Mark

(10) Patent No.: US 7,679,229 B2
(45) Date of Patent: Mar. 16, 2010

(54) RELIEVING STRESS IN A FLEXURE

(75) Inventor: Roger Mark, Barrington, RI (US)

(73) Assignee: Bose Corporation, Framingham, MA (US)

( * ) Notice: Subject to any disclaimer, the term of this patent is extended or adjusted under 35 U.S.C. 154(b) by 112 days.

(21) Appl. No.: 11/871,414

(22) Filed: Oct. 12, 2007

(65) Prior Publication Data

US 2009/0096296 A1 Apr. 16, 2009

(51) Int. Cl.
H02K 35/00 (2006.01)
(52) U.S. Cl. .......................... 310/36; 267/160
(58) Field of Classification Search ............. 310/15–24, 310/36–39, 12; 267/160
See application file for complete search history.

(56) References Cited

U.S. PATENT DOCUMENTS

| | | | |
|---|---|---|---|
| 3,336,488 A | 8/1967 | Scott | |
| 4,139,214 A * | 2/1979 | Meyer | 280/607 |
| 4,538,964 A | 9/1985 | Brown | |
| 5,269,497 A * | 12/1993 | Barth | 267/110 |
| 5,293,782 A * | 3/1994 | Long et al. | 74/25 |
| 6,405,599 B1 | 6/2002 | Patt | |
| 6,991,217 B2 * | 1/2006 | Shimizu et al. | 251/284 |
| 7,216,859 B2 * | 5/2007 | Sebert | 267/160 |
| 7,304,407 B2 * | 12/2007 | Sanematsu et al. | 310/36 |
| 2004/0015042 A1 | 1/2004 | Vincent et al. | |

OTHER PUBLICATIONS

International Search Report and Written opinion dated Jan. 7, 2009, issued in International Application No. PCT/US2008/079017, filed Oct. 7, 2008.

* cited by examiner

*Primary Examiner*—Michael C Zarroli

(57) ABSTRACT

A flexure includes a shaped sheet of material having a middle portion coupled to a magnet, an end portion, and a corner portion between the end portion and the middle portion, the corner portion including a curve with a concave curvature relative to a point of view outside the corner portion. The flexure may be used in a linear motor.

6 Claims, 4 Drawing Sheets

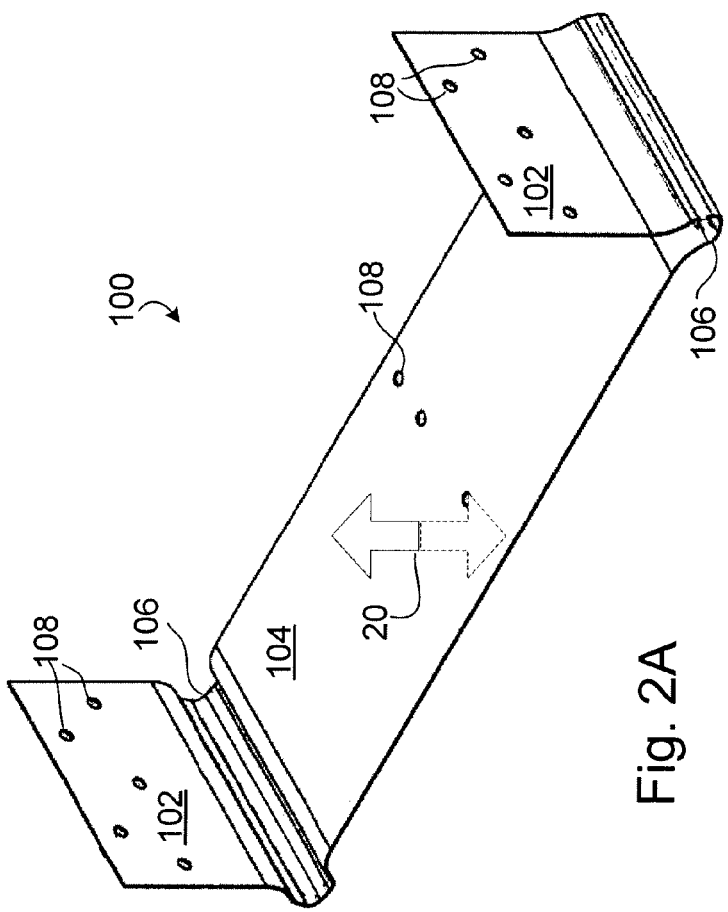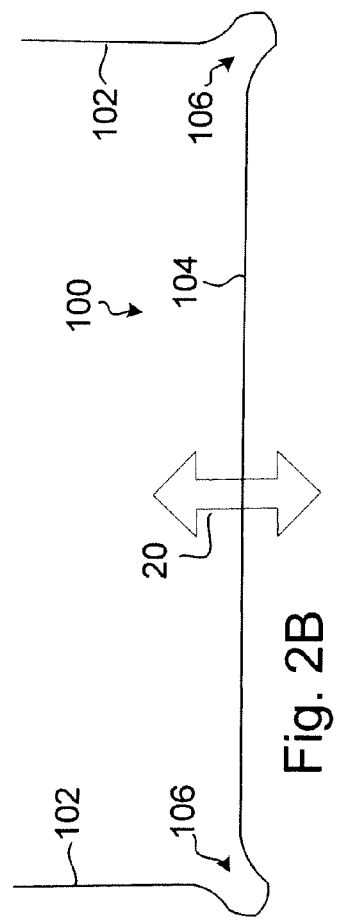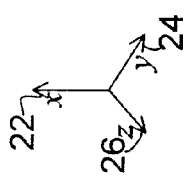

RELIEVING STRESS IN A FLEXURE

BACKGROUND

This disclosure relates to relieving stress in a flexure.

Figure 1:
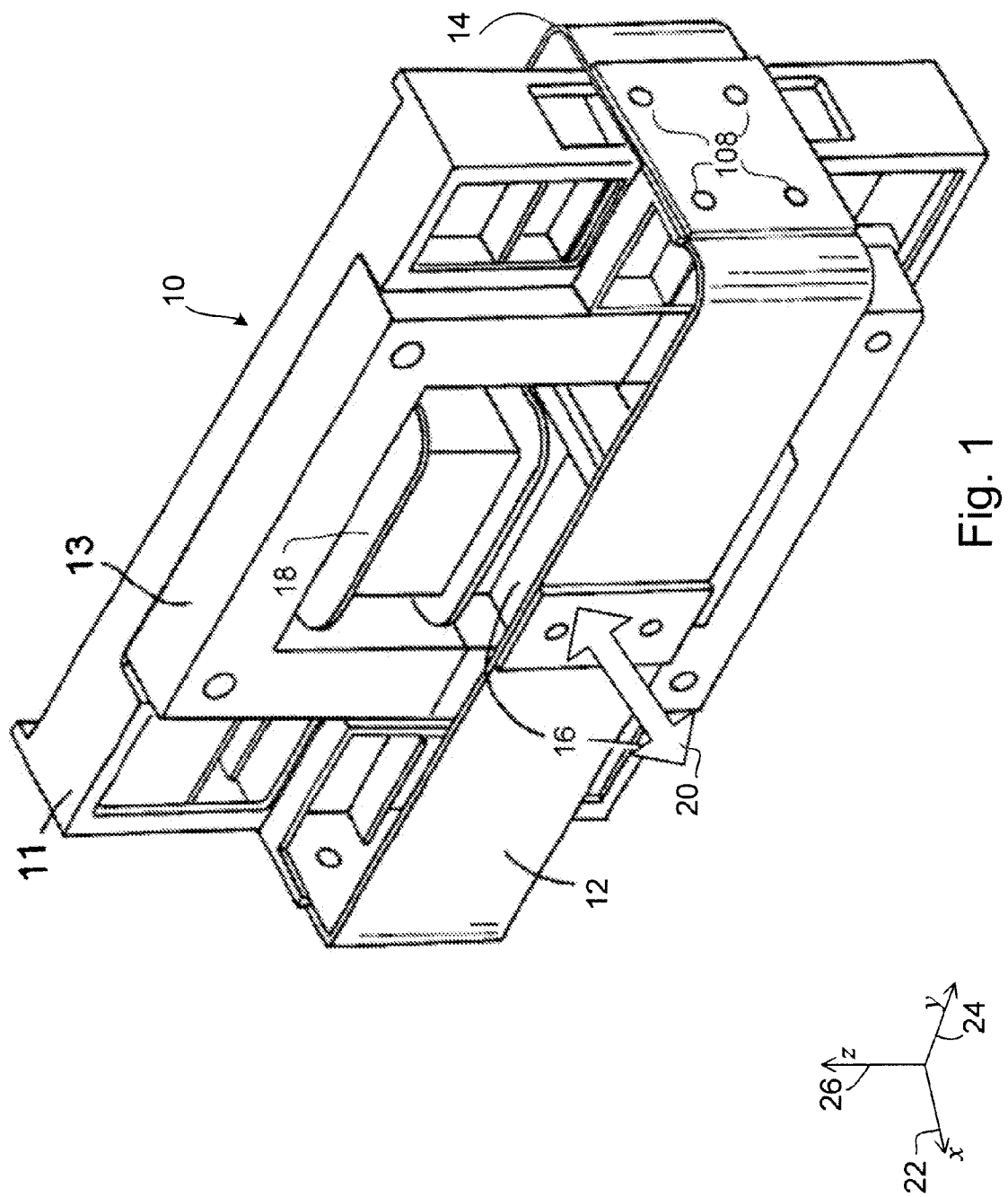

As shown in FIG. 1, a linear moving magnet motor 10, such as the LM series of motors manufactured by Bose Corporation of Framingham, Mass., includes flexures 12 and 14 that support a moving magnet 16 between coils 18. The flexures 12 and 14 are attached to a frame 11 that supports the coils 18 and includes a core portion 13. As the motor 10 moves the magnet 16 in and out (arrow 20) along the x-axis 22, the flexures 12 and 14 restore the magnet toward its neutral position and prevent it from moving in the directions of the y-axis 24 or z-axis 26. The flexures shown in FIG. 1 are generally a U-shaped sheet having a simple curve at the corners of the U-shaped sheet. During operation of the linear motor, repeated bending of the flexure sometimes leads to a fatigue failure in the vicinity of one of the corners of the flexure.

SUMMARY

In general, a flexure includes a shaped sheet of material having a middle portion coupled to a magnet, an end portion, and a corner portion between the end portion and the middle portion, the corner portion including a curve with a concave curvature relative to a point of view outside the corner portion.

Implementations may include one or more of the following features. The corner portion includes a second curve with a convex curvature relative to the point of view. The corner portion is symmetric about a plane that bisects a net planar angle between the middle portion and the end portion. The corner portion includes the first curve, a second curve having a concave curvature relative to the point of view, and a third curve joining the first and second curves and having a convex curvature relative to the point of view. The end portion is generally perpendicular to the middle portion. The corner portion includes generally flat surfaces joined by curves. The generally flat surfaces include first and second surfaces generally parallel to each other and to a plane that bisects a net planar angle between the middle portion and the end portion, and third and fourth surfaces generally perpendicular to each other. The corner portion is generally continuously curved. The corner portion includes a complex curvature. The corner portion includes a compound curvature. The sheet of material includes a stainless steel alloy. The end portion and the middle portion are generally flat. The flexure includes a second end portion and a second corner portion between the second end portion and the middle portion, the second corner portion including a curve with a concave curvature relative to a point of view outside the second corner portion.

In general, in one aspect, a flexure includes a shaped sheet of material having a middle portion coupled to a magnet, an end portion, and a corner portion between the end portion and the middle portion, the corner portion including a curve characterized by a compound curvature.

In general, in one aspect, a linear motor includes a housing, a coil, a magnet, and a flexure joined to the housing and including a shaped sheet of material having a middle portion, an end portion, and a corner portion between the end portion and the middle portion, the corner portion including a curve with a concave curvature relative to a point of view outside the motor.

In general, in one aspect, a linear motor includes a housing, a coil, a magnet, and a flexure joined to the housing and including a shaped sheet of material having a middle portion, an end portion, and a corner portion between the end portion and the middle portion, the corner portion including a curve that protrudes beyond an envelope defined by planes generally containing the middle portion and the end portion.

In general, in one aspect, a linear motor includes a housing, a coil, a magnet, and a flexure joined to the housing and including a shaped sheet of material having a middle portion, an end portion, and a corner portion between the end portion and the middle portion, the corner portion including a curve characterized by a compound curvature.

Advantages include increasing the linearity of the response of the flexure, allowing a smaller package and maintaining a compact footprint for a given amount of stress, and increased tolerance of manufacturing variability by accommodating increased stress in the assembled flexure.

Other features and advantages of the invention will be apparent from the description and the claims.

DESCRIPTION

FIG. 1 shows a motor.
FIG. 2A shows an isometric view of a flexure.
FIG. 2B shows a plan view of a flexure.
FIGS. 3A-3D show plan views of a detail of a flexure.
FIGS. 4A and 4B are graphs.

Stress, stiffness, size, and linearity are all interrelated in the design of flexures for a moving magnet motor. As size is decreased, for example, the behavior of the flexure (force exerted as a function of displacement) tends to become less linear. Reducing intrinsic stress in the flexure tends to make the behavior more linear. For a prescribed displacement, reducing stiffness allows the flexure to withstand greater applied stress. For a given application, i.e., a motor having particular operating characteristics and packaging constraints, a particular combination of intrinsic stress, stiffness, size, and linearity in the flexures and the ability to withstand the highest amount of applied stress can be achieved by varying the shape of the flexure.

In some examples, as shown in FIGS. 2A and 2B, a flexure 100 has two end segments 102 and a middle segment 104 joined at corners 106. The entire flexure 100 may be formed from a single piece of flexible material, such as metal, plastic, or composite. In some examples, one material criteria for the flexure is that it exhibits high fatigue resistance, e.g., it can withstand a maximum stress over a billion cycles. Another consideration is stiffness to prevent the moving magnet from being pulled to one of the coils. In operation, the middle segment 104 moves as shown by arrow 20. To reduce stress throughout the flexure, the corners 106 are shaped to protrude, rather than to be sharp or simply rounded (as in FIG. 1). By "protrude," we mean that the corner extends beyond a boundary defined by the planes containing the middle and end segments of the flexure, as opposed to a simple curved corner that is completely contained within the boundary of those planes. The increased total length of material resulting from the corner shape allows increased movement of the middle segment 104 without increasing the amount of stress such movement puts on the flexure material, relative to a simple corner. This allows the flexure 100 to withstand greater applied stress without failure (breaking or deformation other than the designed deformation) while providing a more linear response during repeated bending in, for example, a fatigue test, in which the linear motor 10 is used to test some other part. The protruding corners 106 provide increased flexibility in the direction of the x-axis, but do not provide significant changes to flexibility in the direction of the z-axis, so the flexure 100 still resists attraction of the magnet 16 (FIG. 1)

toward the coils 18 and adjoining metal. In some examples, if the protrusions are overly exaggerated in size or geometric complexity, unstable buckling or unwanted flexure self-resonance will arise, especially if the protruding corners react like a frictionless hinge.

In some examples, the flexure 100 is attached to the rest of the motor 10 using fasteners through holes 108 in the manner shown in FIG. 1. Manufacturing variability may cause the end segments 102 to not be parallel to each other or perpendicular to the middle segment 104. Bending the flexure 100 to attach it to the motor 10 can add stress to the flexure, but the increased flexibility resulting from the protruding corners 106 accommodates this stress, which makes the flexure easier to install and more tolerant of process variability in manufacturing.

Figure 3A:
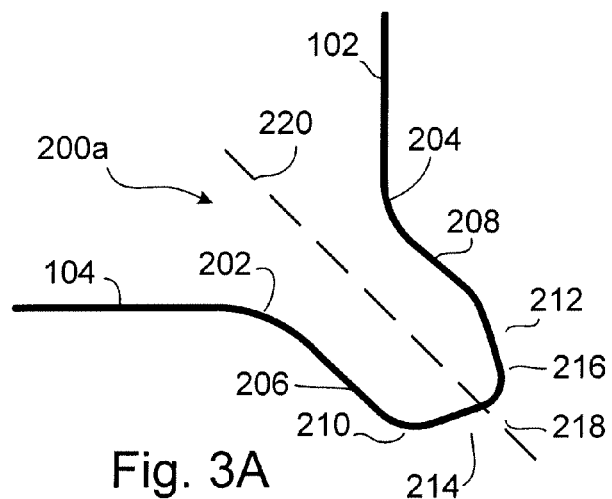

Several shapes for protruding corners 106 are shown in FIGS. 3A-3D. Each shape provides increased flexibility and therefore enables the flexure to withstand increased stress. In FIG. 3A, for a corner shape 200a, rounded corners 202 and 204 lead to angled segments 206 and 208, which are joined by additional rounded corners 210 and 212 to additional segments 214 and 216, which are finally joined to each other by a rounded corner 218. In some examples of this shape, as shown, the segments 206 and 208 are different length, resulting in the segments 214 and 216 not being parallel to the end or middle segments 102 and 104, though they may be perpendicular to each other. In some examples of this shape (not shown), the segments 206 and 208 are the same length, so that segments 214 and 216 are parallel to the middle and end segments of the flexure, respectively. In some examples, the curves 202 and 204 blend into the curves 210 and 212, with the segments 206 and 208 representing only the inflection points between the curves. As shown, corner shape 200a is asymmetric about an axis 220. The axis 220 is defined by a plane that bisects the planar angle that would be formed by one end segment 102 and the middle segment 104, if they met in a sharp corner, i.e., by a plane at a 45-degree angle to the planes containing the middle and end segments.

Figure 3B:
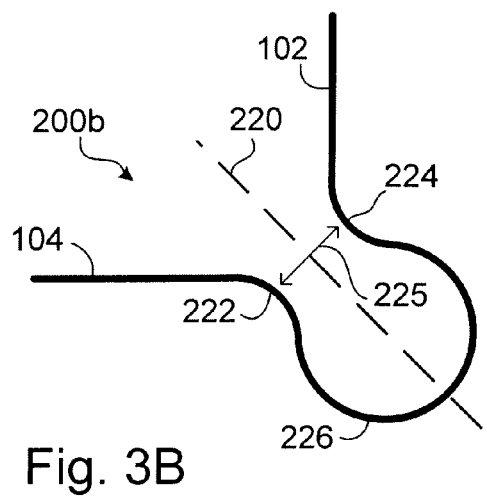
Figure 4A:
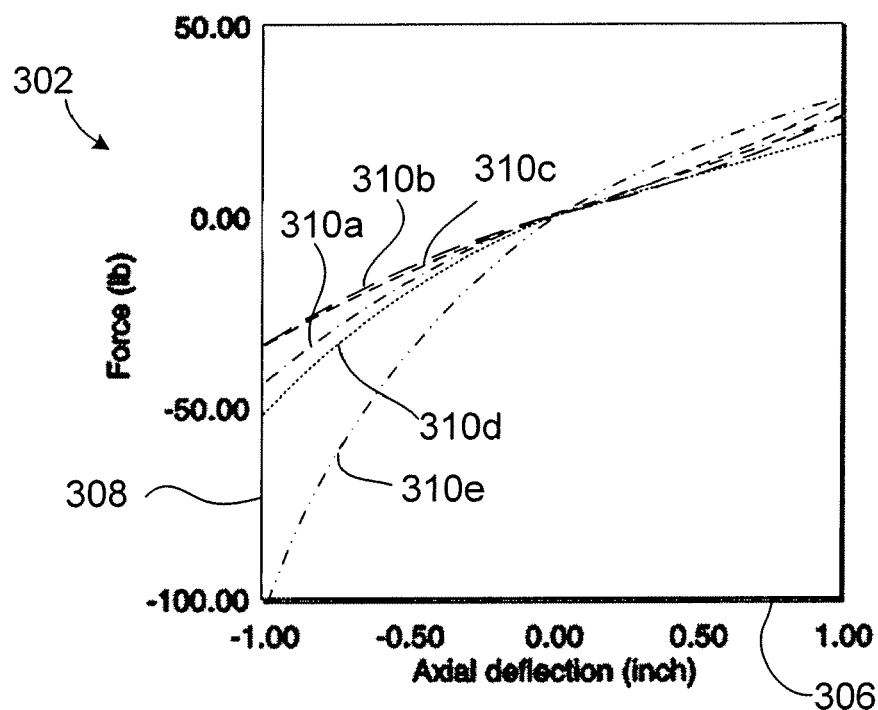
Figure 4B:
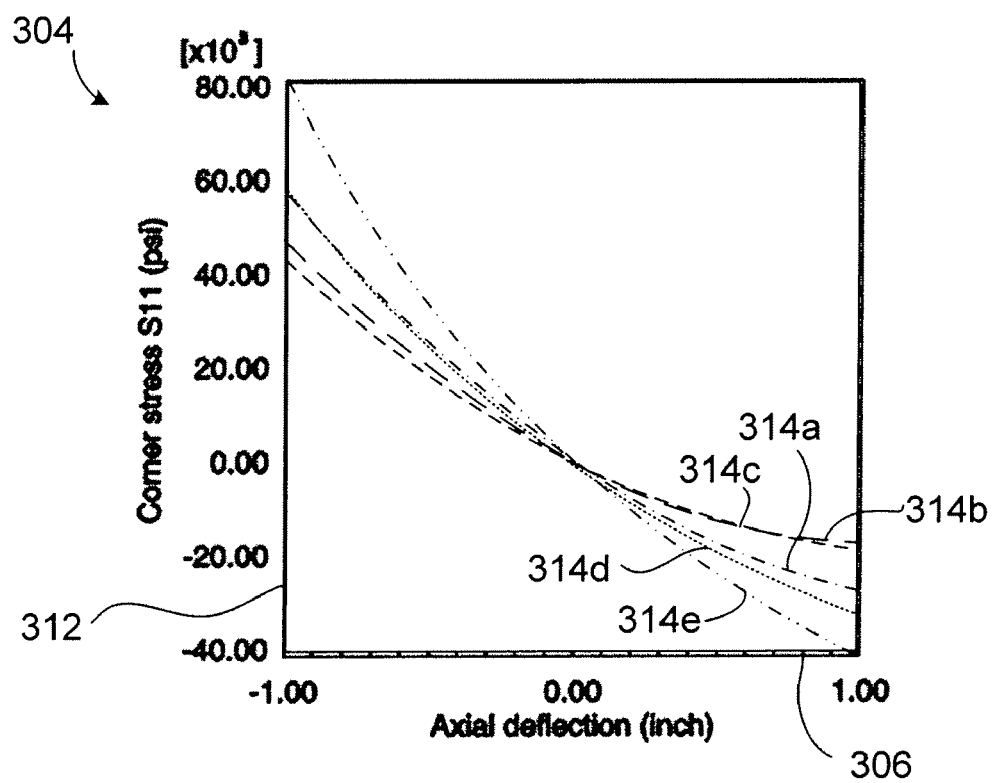

In FIG. 3B, a corner shape 200b includes two rounded corners 222 and 224 forming a neck 225 and connecting to a circular segment 226. The corner shape 200b is symmetric about the axis 220.

Figure 3C:
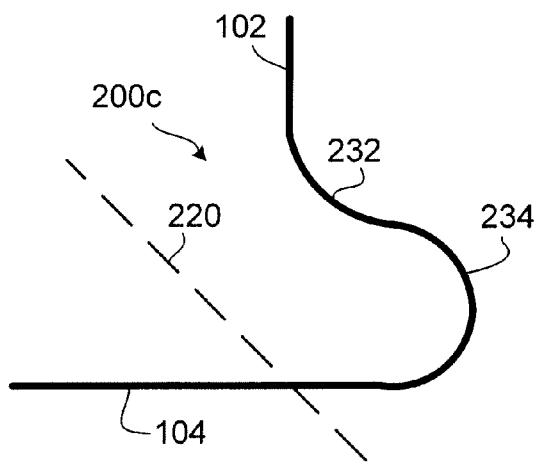
Figure 3D:
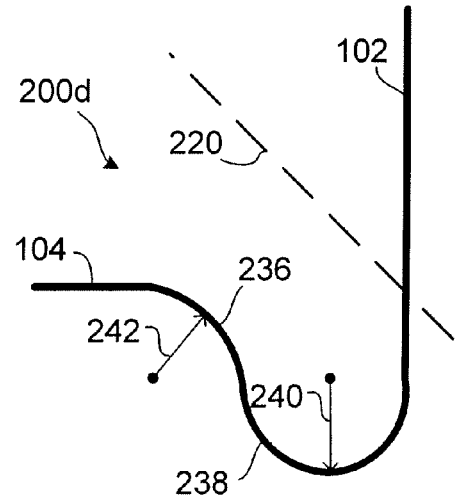

In the examples of FIGS. 3C and 3D, the protrusion is parallel to one of the sides of the flexure, rather than diagonally as in the examples of FIGS. 3A and 3B. In FIG. 3C, a corner shape 200c includes one outwardly-rounded corner 232 leading to a half-circle 234, which leads back to the middle segment 104. Similarly, in FIG. 3D, a corner shape 200d includes one outwardly-rounded corner 236 leading to a half-circle 238 that leads back to the end segment 102. The corner shapes 200c and 200d are not symmetric about the axis 220.

Generally speaking, each of the shapes is characterized by at least one negative radius of curvature. We define a curve that is concave relative to the space within an envelope defined by the shape of the flexure, like corners 210, 212, and 218 and circular sections 226, 234, and 238, as having a positive radius of curvature (see, e.g., radius 240 in FIG. 3D), and we define a curve that is concave relative to a point outside the envelope of the flexure, like corners 202, 204, 222, 224, 232, and 236, as having a negative radius of curvature (see, e.g., radius 242 in FIG. 3D). We refer to curves having a segment with a negative radius of curvature and a segment with a positive radius of curvature as complex. We refer to curves having segments with different radii of curvature as compound.

The different shapes result in different force response behaviors, as shown in a graph 302 of FIG. 4A, and different stresses for a given amount of deflection, as shown in a graph 304 in FIG. 4B. In both graphs, the horizontal axis 306 shows deflection of the flexure 100 along the x-axis (22 in FIGS. 1, 2A, 2B). In the graph 302, the vertical axis 308 shows the force required to achieve the indicated deflection. Lines 310a, 310b, 310c, and 310d correspond to the example corner shapes 200a, 200b, 200c, and 200d in FIGS. 3A-3D, respectively, and line 310e corresponds to the original, simple corner shape in FIG. 1. These curves show that the shaped corners reduce the force exerted by more than half at −1 inch of deflection and the force remains much more linear over the entire range from −1 inch to +1 inch.

In the graph 304, the vertical axis 312 shows the stress induced at the corner 106 of the flexure in thousands of psi (ksi) by the indicated axial deflection. Lines 314a, 314b, 314c, and 314d correspond to the example corner shapes 200a, 200b, 200c, and 200d, respectively, and line 314e corresponds to the original corner shape. Minimizing the positive tensile stress promotes resistance against fatigue. While the original corner shape ranged between 80 ksi at −1 inch of deflection to −40 ksi at +1 inch of deflection, the shaped corners achieve as low as 40 ksi (shapes 200b, 200c) at −1 inch and −15 ksi at +1 inch (shapes 200b and 200c).

Other variations in the behavior of the flexure with different corner shapes include frequencies at which the flexure exhibits resonance. In some examples, the selection of a particular shape is based on a desired resonant behavior, space constraints (e.g., the shape in FIG. 3D may be too large for some applications), needed stabilizing forces, stress limits in fatigue, or upper limits on acceptable flexibility (e.g., some shapes may allow too much movement in the direction of the y-axis 24).

The flexure 100 can be formed in several different ways, including stamping or forming, bending using a brake press, and bending with hand tools. The particular techniques used may depend on the material used and typical manufacturing considerations such as capacity, throughput, and quality control. Some forming techniques may not work with some corner shapes. For example, the corner 200b of FIG. 3B would be difficult to form with a standard stamp press, because the male portion of such a press would have to slide in the direction of the z-axis 26 to be removed after forming, due to the neck 225 between the corners 222 and 224 being narrower than the circular curve 226.

The material used for the flexure is selected based on various needs, such as the expected or targeted stress, strain, stiffness, deflection capability, load handling capacity, number of duty cycles, and operating temperature. High fatigue resistant (100 ksi or greater endurance limit) materials include, stainless steel alloys (e.g., Uddeholm SS716 or Sandvik 7C27Mo2). Other possible materials include spring steel, composites, and plastics (e.g., Dupont Vespel).

Other implementations are within the scope of the following claims and other claims to which the applicant may be entitled.

What is claimed is:

1. A linear motor comprising:
   a housing;
   a first coil supported by the housing;
   a second coil supported by the housing;
   a magnet; and
   a flexure supporting the magnet at a position between the first and second coils, having flexibility to permit the magnet to move along an axis extending between the first and second coils while also having stiffness to restrain movement of the magnet towards either the first or second coils such that the magnet is prevented from coming into contact with either first or second coils, the flexure comprising a shaped sheet of material comprising:

a middle portion;

a first end portion joined to the housing;

a second end portion substantially parallel to the first end portion and joined to the housing;

a first corner portion joining the first end portion to the middle portion, and comprising both a curve having a positive radius of curvature that is concave relative to a point of view inside the linear motor and a curve having a negative radius of curvature that is concave relative to a point of view outside the linear motor; and a second corner portion joining the second end portion to the middle portion, and comprising both a curve having a positive radius of curvature that is concave relative to a point of view inside the linear motor and a curve having a negative radius of curvature that is concave relative to a point of view outside the linear motor.

2. The motor of claim 1 in which the corner portion of the flexure is composed of generally flat surfaces joined by curves.

3. The motor of claim 2 in which the generally flat surfaces include:

first and second surfaces generally parallel to each other and to a plane that bisects a net planar angle between the middle portion and the end portion of the flexure; and third and fourth surfaces generally perpendicular to each other.

4. The motor of claim 1 in which the sheet of material of the flexure comprises a stainless steel alloy.

5. A linear motor comprising:

a housing;

a first coil supported by the housing;

a second coil supported by the housing;

a magnet; and a flexure supporting the magnet at a position between the first and second coils, having flexibility to permit the magnet to move along an axis extending between the first and second coils while also having stiffness to restrain movement of the magnet towards either the first or second coils such that the magnet is prevented from coming into contact with either first or second coils, the flexure comprising a shaped sheet of material comprising:

a middle portion;

a first end portion joined to the housing;

a second end portion substantially parallel to the first end portion and joined to the housing;

a first corner portion joining the first end portion to the middle portion, and protruding beyond an envelope defined by planes generally containing the middle portion and the first and second end portions: and a second corner portion joining the second end portion to the middle portion, and protruding beyond the envelope.

6. The motor of claim 5 in which the corner portion includes a curve with a concave curvature relative to a point of view outside the envelope.

* * * * *